United States Patent
Jarrahi Khameneh et al.

(10) Patent No.: US 10,979,182 B2
(45) Date of Patent: Apr. 13, 2021

(54) MANAGING HYBRID AUTOMATIC REPEAT REQUEST (HARQ) MEMORY FOR RADIO TUNE-AWAY

(71) Applicant: QUALCOMM Incorporated, San Diego, CA (US)

(72) Inventors: Ali Jarrahi Khameneh, San Diego, CA (US); Deepti Mani, San Diego, CA (US); Cheol Hee Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 15/798,308

(22) Filed: Oct. 30, 2017

(65) Prior Publication Data

US 2019/0132090 A1     May 2, 2019

(51) Int. Cl.
*H04L 1/18* (2006.01)
*H04W 36/14* (2009.01)
*H04W 88/02* (2009.01)

(52) U.S. Cl.
CPC .......... *H04L 1/1835* (2013.01); *H04L 1/1812* (2013.01); *H04L 1/1822* (2013.01); *H04W 36/14* (2013.01); *H04W 88/02* (2013.01)

(58) Field of Classification Search
None
See application file for complete search history.

(56) References Cited

U.S. PATENT DOCUMENTS

| 2010/0322165 | A1* | 12/2010 | Yoo | H04L 1/1812 370/329 |
| 2011/0026498 | A1* | 2/2011 | Zheng | H04L 5/0042 370/336 |
| 2011/0319068 | A1* | 12/2011 | Kim | H04W 72/0453 455/422.1 |
| 2012/0057529 | A1* | 3/2012 | Seo | H04L 1/1835 370/328 |
| 2012/0087396 | A1* | 4/2012 | Nimbalker | H04L 1/1822 375/219 |
| 2012/0099466 | A1* | 4/2012 | Aoyama | H04L 47/29 370/252 |
| 2012/0207040 | A1* | 8/2012 | Comsa | H04W 72/1215 370/252 |
| 2012/0275397 | A1* | 11/2012 | Hsieh | H04L 1/1812 370/329 |
| 2014/0031036 | A1* | 1/2014 | Koo | H04W 36/14 455/434 |

(Continued)

*Primary Examiner* — Gregory B Sefcheck
*Assistant Examiner* — Suk Jin Kang
(74) *Attorney, Agent, or Firm* — Dalei Dong

(57) ABSTRACT

Methods, systems, and devices for wireless communication are described. A user equipment (UE) may be configured to include procedures to selectively release a portion of hybrid automatic repeat request (HARQ) memory based on the priority of each component carrier of the first connection when performing a radio tune-away to a second connection. For example, the UE may determine the amount of memory space associated with the HARQ processes for the second connection and selectively release a portion of HARQ memory based on the priority of each component carrier of the first connection when the determined amount of memory space is greater than the empty space of the HARQ memory.

44 Claims, 3 Drawing Sheets

(56) References Cited

U.S. PATENT DOCUMENTS

| | | | | |
|---|---|---|---|---|
| 2014/0086152 A1* | 3/2014 | Bontu | H04L 1/1812 | 370/329 |
| 2014/0198758 A1* | 7/2014 | Nimbalker | H04L 1/1822 | 370/329 |
| 2014/0293917 A1* | 10/2014 | Yoo | H04L 1/1812 | 370/329 |
| 2015/0103752 A1* | 4/2015 | Yu | H04L 1/1874 | 370/329 |
| 2015/0189546 A1* | 7/2015 | Earnshaw | H04L 1/1858 | 370/329 |
| 2015/0215825 A1* | 7/2015 | Kim | H04W 36/0088 | 370/331 |
| 2015/0237675 A1* | 8/2015 | Su | H04W 88/06 | 455/552.1 |
| 2015/0256303 A1* | 9/2015 | Belghoul | H04L 5/006 | 370/329 |
| 2015/0280880 A1* | 10/2015 | Yang | H04L 5/0053 | 370/329 |
| 2015/0282237 A1* | 10/2015 | Su | H04W 76/16 | 455/552.1 |
| 2015/0288503 A1* | 10/2015 | Earnshaw | H04L 1/1671 | 370/280 |
| 2015/0334764 A1* | 11/2015 | Rahman | H04W 24/02 | 370/328 |
| 2015/0334765 A1* | 11/2015 | Rahman | H04W 24/02 | 370/328 |
| 2016/0072612 A1* | 3/2016 | Seo | H04L 1/22 | 370/329 |
| 2016/0088635 A1* | 3/2016 | Davydov | H04L 1/1812 | 370/329 |
| 2016/0095086 A1* | 3/2016 | Zhang | H04L 5/001 | 370/329 |
| 2016/0227540 A1* | 8/2016 | Chen | H04L 5/001 | |
| 2016/0227547 A1* | 8/2016 | Su | H04W 52/0232 | |
| 2016/0241362 A1* | 8/2016 | El-Khamy | H04L 5/001 | |
| 2016/0242181 A1* | 8/2016 | Ponukumati | H04L 5/001 | |
| 2016/0277983 A1* | 9/2016 | Kim | H04W 36/0088 | |
| 2016/0309372 A1* | 10/2016 | Su | H04W 36/0016 | |
| 2016/0366000 A1* | 12/2016 | Pelletier | H04L 5/0053 | |
| 2017/0048773 A1* | 2/2017 | Miao | H04W 8/183 | |
| 2017/0070877 A1* | 3/2017 | Shi | H04W 8/183 | |
| 2017/0094568 A1* | 3/2017 | Yang | H04W 36/14 | |
| 2017/0094628 A1* | 3/2017 | Miao | H04W 60/00 | |
| 2017/0126373 A1* | 5/2017 | Aoyama | H04L 47/29 | |
| 2017/0170889 A1* | 6/2017 | Kim | H04L 5/001 | |
| 2017/0222763 A1* | 8/2017 | Lee | H04L 1/1812 | |
| 2017/0257807 A1* | 9/2017 | Zacharias | H04W 36/14 | |
| 2017/0273132 A1* | 9/2017 | Park | H04L 1/1812 | |
| 2017/0318502 A1* | 11/2017 | Singh | H04W 76/10 | |
| 2018/0007602 A1* | 1/2018 | Jamadagni | H04W 4/06 | |
| 2018/0176960 A1* | 6/2018 | Dinan | H04W 56/0005 | |
| 2019/0021109 A1* | 1/2019 | Yi | H04W 76/27 | |
| 2019/0037591 A1* | 1/2019 | Lee | H04W 76/27 | |
| 2019/0140788 A1* | 5/2019 | Aoyama | H04L 5/001 | |

\* cited by examiner

MANAGING HYBRID AUTOMATIC REPEAT REQUEST (HARQ) MEMORY FOR RADIO TUNE-AWAY

BACKGROUND

Field of the Disclosure

The following relates generally to wireless communication, and more specifically to management of hybrid automatic repeat request (HARQ) memory for radio tune-away.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. A wireless multiple-access communications system may include a number of base stations or network access nodes, each simultaneously supporting communication for multiple communication devices, which may be otherwise known as user equipment (UE).

A user equipment (UE) may support concurrent radio access technologies (RAT) using one or more SIM cards. Similarly, a UE may support concurrent subscription services from different mobile network operators using one or more SIM cards. When there is only one radio transceiver in the UE, the UE may need to tune away its radio transceiver from one RAT (first RAT) to another RAT (second RAT). When the second RAT activity is done, the UE tunes its radio transceiver back to the first RAT.

Before tuning away from the first RAT to the second RAT, there may be data activity through the first RAT. For example, the UE may be receiving downlink data from a base station through the first RAT. When receiving downlink data, hybrid automatic repeat request (HARQ) process may be utilized. Also, when the UE uses multiple component carriers to receive downlink data, HARQ process is operated for each component carrier. For each HARQ process, HARQ contents necessary to decode the received data are stored in a HARQ memory. Each component carrier may further utilize multi-input multi-output (MIMO) communication, where there can be multiple layers, or spatial streams, of downlink data.

SUMMARY

The described techniques relate to improved methods, systems, devices, or apparatuses that support management of hybrid automatic repeat request (HARQ) memory for radio tune-away in accordance with various aspects of the present disclosure.

A method of wireless communication is described. The method may include receiving data through one or more component carriers using a first radio access technology (RAT) and a first subscription service, wherein the data is received using a first set of hybrid automatic repeat request (HARQ) processes, determining to perform a radio tune-away to a second RAT or a second subscription service, determining an amount of memory space associated with a second set of HARQ processes for the second RAT or the second subscription service, and selectively releasing a portion of a HARQ memory based on a priority of each of the one of more component carriers in response to the determined amount of memory space being greater than the empty space of the HARQ memory.

An apparatus for wireless communication is described. The apparatus may include means for receiving data through one or more component carriers using a first radio access technology (RAT) and a first subscription service, wherein the data is received using a first set of hybrid automatic repeat request (HARQ) processes, means for determining to perform a radio tune-away to a second RAT or a second subscription service, means for determining an amount of memory space associated with a second set of HARQ processes for the second RAT or the second subscription service, and means for selectively releasing a portion of a HARQ memory based on a priority of each of the one of more component carriers in response to the determined amount of memory space being greater than the empty space of the HARQ memory.

Another apparatus for wireless communication is described. The apparatus may include a processor, memory in electronic communication with the processor, and instructions stored in the memory. The instructions may be executable by the processor to cause the apparatus to receive data through one or more component carriers using a first radio access technology (RAT) and a first subscription service, wherein the data is received using a first set of hybrid automatic repeat request (HARQ) processes, determine to perform a radio tune-away to a second RAT or a second subscription service, determine an amount of memory space associated with a second set of HARQ processes for the second RAT or the second subscription service, and selectively release a portion of a HARQ memory based on a priority of each of the one of more component carriers in response to the determined amount of memory space being greater than the empty space of the HARQ memory.

A non-transitory computer readable medium storing code for wireless communication is described. The code may include instructions executable by a processor to receive data through one or more component carriers using a first radio access technology (RAT) and a first subscription service, wherein the data is received using a first set of hybrid automatic repeat request (HARQ) processes, determine to perform a radio tune-away to a second RAT or a second subscription service, determine an amount of memory space associated with a second set of HARQ processes for the second RAT or the second subscription service, and selectively release a portion of a HARQ memory based on a priority of each of the one of more component carriers in response to the determined amount of memory space being greater than the empty space of the HARQ memory.

DETAILED DESCRIPTION

A user equipment (UE) may support concurrent radio access technologies (RAT), for example, GSM/UMTS and LTE, using one or more subscriber identity module (SIM) cards. Similarly, a UE may support concurrent subscription services from different mobile network operators using one or more SIM cards. When there is only one radio transceiver in the UE, the UE may need to tune away its radio transceiver from one RAT (first RAT) to another RAT (second RAT). A radio tune-away here refers to changing or tuning the operating radio frequency (or, carrier frequency) of the UE's transceiver to a different operating radio frequency, which is associated with the second RAT. This tune-away may also occur when switching from one subscription service to another subscription. When the second RAT activity is done, the UE can tune its radio transceiver back to the first RAT.

Before tuning away from the first RAT to the second RAT, there may be data activity through the first RAT. For example, the UE may be receiving downlink data from a base station. When receiving downlink data, hybrid automatic repeat request (HARQ) process is used when there are errors during the reception. Also, when the UE uses multiple component carriers to receive downlink data, for example, using LTE Carrier Aggregation, HARQ process is operated for each component carrier. For each HARQ process, HARQ contents necessary to decode the received data are stored in a HARQ memory. Each component carrier may also utilize multi-input multi-output (MIMO) communication, where there can be multiple layers, or spatial streams, of downlink data. Each layer also may operate its own HARQ process.

When a UE decides to perform a radio tune-away while connected to a first RAT and a first subscription service, the UE may release all of its HARQ memory in order to use the HARQ memory for the second connection (using the second RAT and/or the second subscription service). Releasing HARQ memory may involve erasing the existing content and re-assigning the memory for another process or task. In this case, all HARQ contents associated with the first connection before the radio tune-away will be lost and after tuning back to the first connection, the data activity experiences performance loss due to loss of all HARQ contents associated with the first connection. In accordance with an aspect, the UE may not release all of its HARQ memory but may selectively release a portion of its HARQ memory to minimize data activity disruption on the first connection.

Aspects of the disclosure are initially described in the context of a wireless communications system. Specific examples are described for managing hybrid automatic repeat request (HARQ) memory for radio tune-away. Aspects of the disclosure are further illustrated by and described with reference to apparatus diagrams, system diagrams, and flowcharts that relate to management of HARQ memory for radio tune-away.

Figure 1:
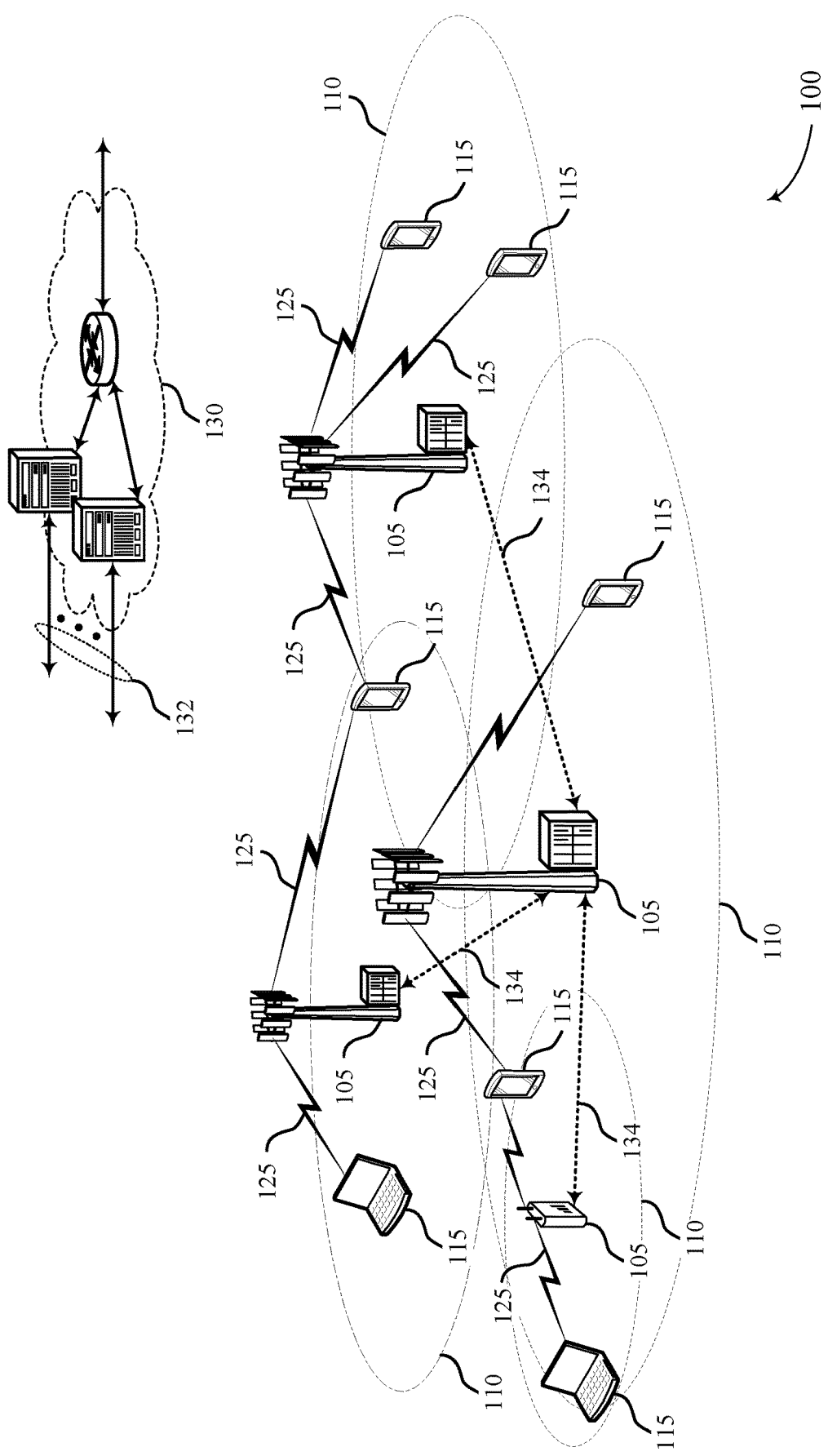
FIG. 1 illustrates an example of a system for wireless communication.

FIG. 1 illustrates an example of a wireless communications system 100 that supports management of hybrid automatic repeat request (HARQ) memory for radio tune-away in accordance with various aspects of the present disclosure. The wireless communications system 100 includes base stations 105, UEs 115, and a core network 130. In some examples, the wireless communications system 100 may be a Global System for Mobile (GSM) network, a Universal Mobile Telecommunications System (UMTS) network, a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or a Machine-Type Communication (MTC) device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Further, the wireless communications system 100 may support communication with a UE 115 on multiple cells or carriers (each carrier is referred to as a component carrier), a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers. In carrier aggregation, one of the component carriers functions as a primary component carrier (also referred to as an anchor carrier). Primary component carrier handles radio resource control (RRC) and non-access stratum (NAS) procedures and also manages measurement reports and mobility for the entire aggregated carriers. A non-primary component carrier is referred to as a secondary component carrier.

Figure 2:
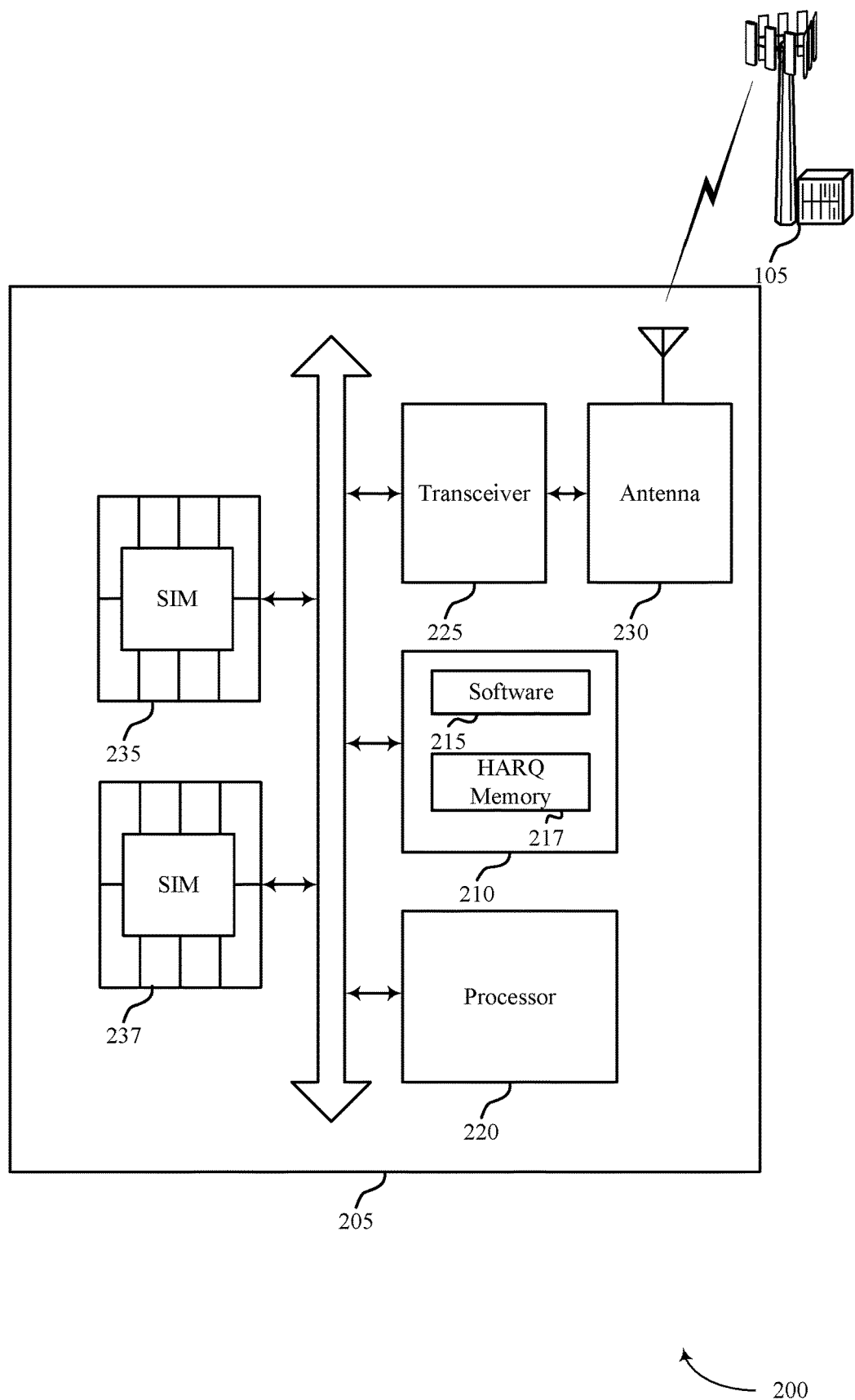
FIG. 2 shows block diagrams of a device that supports management of hybrid automatic repeat request (HARQ) memory for radio tune-away in accordance with aspects of the present disclosure.

FIG. 2 shows a block diagram 200 of a wireless device 205 that supports management of HARQ memory for radio tune-away in accordance with aspects of the present disclosure. Wireless device 205 may be an example of aspects of a UE 115 as described herein. Wireless device 205 may include memory 210, processor 220, transceiver 225, antenna 230 and SIM 235, 237. Each of these modules may communicate, directly or indirectly, with one another (e.g., via one or more buses).

The memory 210 may include random access memory (RAM) and/or read only memory (ROM). The memory 210 may store computer-readable, computer-executable software including instructions that, when executed, cause the processor to perform various functions described herein. In some cases, the software 215 may not be directly executable by the processor but may cause a computer (e.g., when compiled and executed) to perform functions described herein. The memory 210 may also include a HARQ memory 217 for management of HARQ memory for radio tune-away in accordance with aspects of the present disclosure. The HARQ memory 217 may also be implemented with an array of memories.

The transceiver 225 may communicate bi-directionally, via one or more antennas, wired, or wireless links, with one or more networks, as described above. For example, the transceiver 225 may communicate bi-directionally with a base station 105 or a UE 115. The transceiver 225 may also include a modem to modulate the packets and provide the modulated packets to the antennas for transmission, and to demodulate packets received from the antennas.

The processor 220 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 220 may be configured to operate a memory 210 using a memory controller. In other cases, a memory controller may be integrated into processor 220. Processor 220 may be configured to execute computer-readable instructions stored in a memory 210 to perform various functions (e.g., functions or tasks supporting management of HARQ memory for radio tune-away in accordance with aspects of the present disclosure). The term processor is used herein in accordance with its meaning as structure.

The software 215 may include code configured to manage HARQ memory for radio tune-away in accordance with aspects of the present disclosure. Software 215 may be stored in a non-transitory computer-readable medium such as system memory or other memory. In some cases, the software 215 may not be directly executable by the processor but may cause a computer (e.g., when compiled and executed) to perform functions described herein.

In some cases, the wireless device may include a single antenna 230. However, in some cases the device may have more than one antenna 230, which may be capable of concurrently transmitting or receiving multiple wireless transmissions.

The SIM 235 may be an integrated circuit (IC) that securely stores an international mobile subscriber identify (IMSI) and the related key used to identify and authenticate a wireless device 205. SIM 235 may also contain a unique serial number, e.g., an integrated circuit card identification (ICCID), security authentication and ciphering information, temporary information related to the local network, a list of the services, a personal identification number (PIN), and a PIN unblocking key (PUK) for PIN unlocking. In some cases, SIM 235 may be a circuit embedded in a removable card or directly embedded on the wireless device 205, or the UE 115. SIM 235 may be also referred to as universal subscriber identity module (USIM) in LTE network. The UE 115 can have one or more SIMs. For example, the UE 115 may include two SIMs 235, 237 to support two different subscription services, which is referred to as dual SIM dual standby (DSDS). Also, a single SIM 235 may support two different subscription services, which is referred to as single SIM dual subscription (SSDS).

Figure 3:
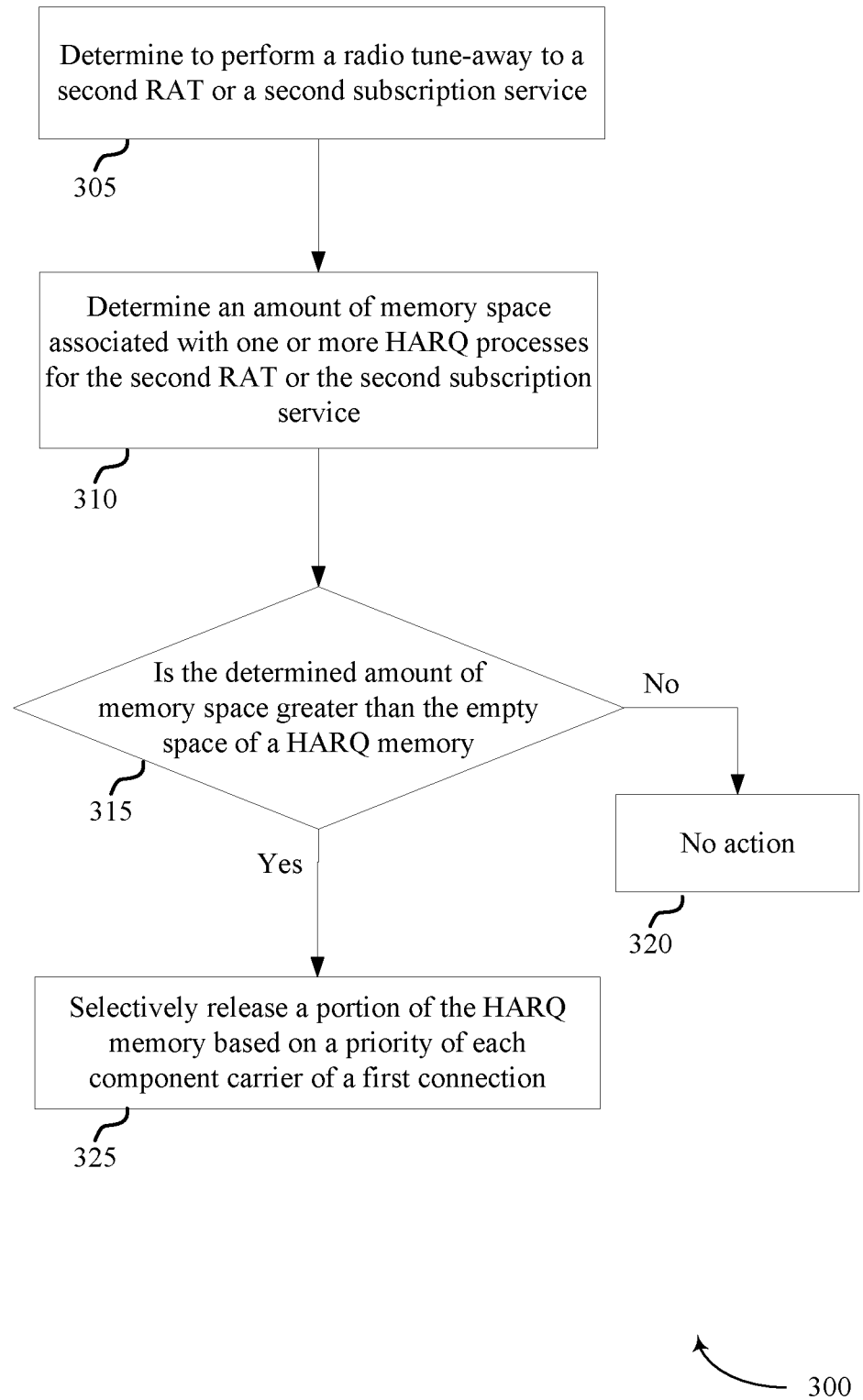
FIG. 3 illustrates methods for management of HARQ memory for radio tune-away in accordance with aspects of the present disclosure.

FIG. 3 shows a flowchart illustrating a method 300 for management of hybrid automatic repeat request (HARQ) memory for radio tune-away in accordance with aspects of the present disclosure. The operations of method 300, for example, may be implemented by a UE 115 or its components as described herein. For example, the operations of method 300 may be performed by a processor as described with reference to FIG. 2. In some examples, a UE 115 may execute a set of codes to control the functional elements of the device to perform the functions described below. Additionally or alternatively, the UE 115 may perform aspects of the functions described below using special-purpose hardware. Further, although the present application will be disclosed with reference to UE 115 only having one radio transceiver, in other embodiments, UE 115 may include multiple transceivers.

At block 305, the UE 115 may determine to perform a radio tune-away to a second connection from a first connection, which uses a first radio access technology (RAT) and a first subscription service. The second connection may use a second RAT or a second subscription service (or both). Also, the second connection may use a different operating radio frequency (or, carrier frequency) from that of the first connection. At the time of determination, the UE may have been receiving data through the first connection. The first connection may utilize carrier aggregation, which aggregates multiple component carriers for transmitting and receiving data. Separate HARQ process may be utilized for each component carrier. The first connection may also utilize multi-input multi-output (MIMO) communication for each component carrier, where there can be multiple layers of data (a layer refers to an independent data stream used in conjunction with spatial multiplexing for MIMO communication). Further, each layer of data may utilize its own HARQ process to correct for erroneous data reception.

At block 310, the UE 115 may determine an amount of memory space associated with one or more HARQ processes for the second connection. The amount of memory space may be calculated based on one or more parameters such as a number of component carriers, a number of layers, transport block size, and other data transmission parameters related to the second connection.

At block 315, the UE 115 may determine whether the determined amount of memory space is greater than the empty space of a HARQ memory in the UE, which is a memory for storing HARQ process-related contents. The HARQ process-related contents may include original received data packets with failed decoding, re-transmitted data packets, or other types of received data packets during the HARQ process. If the determined amount of memory space is less than or equal to the empty space of the HARQ memory, then at block 320, no action is taken further.

At block 325, if the determined amount of memory space is greater than the empty space of the HARQ memory, the UE may selectively release a portion of the HARQ memory based on the priority of each component carrier in the first connection in order to accommodate the second connection, which may use one or more HARQ processes. For example, only the portion of HARQ memory associated with certain component carriers with lower priority may be released. Further, the portion of the HARQ memory may be selectively released based on the priority of each of the HARQ processes within each component carrier to be released. For example, only the portion of HARQ memory associated with certain HARQ processes with lower priority may be released. In addition, the portion of the HARQ memory may be selectively released based on the priority of each of the code block decoding processes within each HARQ process, where each HARQ process consists of multiple code block decoding processes. For example, only the portion of HARQ memory associated with certain code block decoding processes with lower priority may be released.

The released portion of the HARQ memory may be repurposed for the HARQ processes of the second connection. For example, the UE may release the portion of the HARQ memory associated with component carriers of the first connection having the N-lowest priority (N=1, 2, . . . ). Further, a component carrier with a connection status of "active" may have higher priority than a component carrier with a connection status of "configured." For example, a connection status of "configured" may refer to the status where a component carrier is configured to receive data but is not yet capable of receiving data. A component carrier may need to be activated from "configured" connection status in order to be capable of receiving data. A connection status of "active" may refer to the status where a component carrier is capable of receiving data or is actively receiving data.

For releasing the portion of the HARQ memory, the UE may identify a list of to-be-released component carriers from the component carriers of the first connection based on the priority. The list of to-be-released component carriers may include component carriers with the N-lowest priority (N=1, 2, . . . ). The primary component carrier (or, anchor carrier) may have the highest priority and may be excluded from the list of to-be-released component carriers. Also, a component carrier with a connections status as "active" may have the next highest priority and may be excluded from the list of to-be-released component carriers. After identifying the list of to-be-released component carriers, the UE may release the portion of the HARQ memory associated with the identified list of to-be-released component carriers.

The priority of each of the component carrier of the first connection may be further based on a load metric for each of the component carrier. The load metric may be calculated based on HARQ parameters, which are operation parameters related to the HARQ process associated with each of the component carrier. HARQ parameters, for example, may include HARQ identification (ID), HARQ time window, new data indicator (NDI), number of transport blocks, decode-fail transport block (TB) size, and number of transmission layers for MIMO. For example, the load metric may be an arithmetic product of the number of transport blocks and the decode-fail TB size.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving data through one or more component carriers using a first radio access technology (RAT) and a first subscription service, wherein the data is received using a first set of hybrid automatic repeat request (HARQ) processes;
determining to perform a radio tune-away to a second RAT or a second subscription service;
determining an amount of memory space associated with a second set of HARQ processes for the second RAT or the second subscription service; and
selectively releasing, based at least in part on the determined amount of memory space being greater than an available space of an HARQ memory, a portion of the HARQ memory used for the first set of HARQ process, the releasing of the portion of the HARQ memory used for the first set of HARQ process comprises:
identifying a list of to-be released component carriers from the one or more component carriers based on a priority of each of the one or more component carriers and the priority of each of the one or more component carriers is based on whether each of the one or more component carriers is actively receiving data; and
releasing the portion of the HARQ memory used for the first set of HARQ process associated with the identified list of to-be-release component carriers.

2. The method of claim 1, wherein:
whether each of the one or more component carriers is actively receiving data is indicated by a connection status, wherein the connection status is one of configured or active.

3. The method of claim 2, wherein:
the priority of each of the one or more component carriers is further based on a load metric for each of the one or more component carriers, wherein the load metric is calculated based on HARQ parameters.

4. The method of claim 3, wherein:
the HARQ parameters comprise at least one of a HARQ identification (ID), a HARQ time window, a new data indicator, a number of transport blocks, a decode-fail transport block (TB) size, or a number of transmission layers, or combinations thereof.

5. The method of claim 1, wherein: a primary component carrier is excluded from the list of to-be-released component carriers.

6. The method of claim 1, wherein: a component carrier with a connection status as active is excluded from the list of to-be-released component carriers.

7. The method of claim 1, wherein:
the method is performed by a user equipment (UE) with only one radio transceiver and one or more subscriber identification modules (SIM).

8. The method of claim 7, wherein:
the UE is capable of dual SIM dual standby (DSDS).

9. The method of claim 7, wherein:
the UE is capable of single SIM dual subscription (SSDS).

10. The method of claim 1, wherein:
selectively releasing the portion of the HARQ memory is further based on a priority of each of the first set of HARQ processes.

11. The method of claim 10, wherein:
selectively releasing the portion of the HARQ memory is further based on a priority of each of a plurality of code block decoding processes within each of the first set of HARQ processes.

12. An apparatus for wireless communication, comprising:
a processor;
memory coupled to the processor; and
instructions stored in the memory and operable, when executed by the processor, to cause the apparatus to:
receive data through one or more component carriers using a first radio access technology (RAT) and a first subscription service, wherein the data is received using a first set of hybrid automatic repeat request (HARQ) processes;
determine to perform a radio tune-away to a second RAT or a second subscription service;
determine an amount of memory space associated with a second set of HARQ processes for the second RAT or the second subscription service; and
selectively release, based at least in part on the determined amount of memory space being greater than an available space of an HARQ memory, a portion of the HARQ memory used for the first set of HARQ process, the releasing of the portion of the HARQ memory used for the first set of HARQ process comprises:
identify a list of to-be-released component carriers from the one or more component carriers based on a priority of each of the one or more component carriers and the priority of each of the one or more component carriers is based on whether each of the one or more component carriers is actively receiving data; and
release the portion of the HARQ memory used for the first set of HARQ process associated with the identified list of to-be-release component carriers.

13. The apparatus of claim 12, wherein:
whether each of the one or more component carriers is actively receiving data is indicated by a connection status, wherein the connection status is one of configured or active.

14. The apparatus of claim 13, wherein:
the priority of each of the one or more component carriers is further based on a load metric for each of the one or more component carriers, wherein the load metric is calculated based on HARQ parameters.

15. The apparatus of claim 14, wherein:
the HARQ parameters comprise at least one of a HARQ identification (ID), a HARQ time window, a new data indicator, a number of transport blocks, a decode-fail transport block (TB) size, or a number of transmission layers, or combinations thereof.

16. The apparatus of claim 12, wherein: a primary component carrier is excluded from the list of to-be-released component carriers.

17. The apparatus of claim 12, wherein: a component carrier with a connection status as active is excluded from the list of to-be-released component carriers.

18. The apparatus of claim 12, wherein:
the apparatus is a user equipment (UE) with only one radio transceiver and one or more subscriber identification modules (SIM).

19. The apparatus of claim 18, wherein:
the UE is capable of dual SIM dual standby (DSDS).

20. The apparatus of claim 18, wherein:
the UE is capable of single SIM dual subscription (SSDS).

21. The apparatus of claim 12, wherein:
selectively releasing the portion of the HARQ memory is further based on a priority of each of the first set of HARQ processes.

22. The apparatus of claim 21, wherein:
selectively releasing the portion of the HARQ memory is further based on a priority of each of a plurality of code block decoding processes within each of the first set of HARQ processes.

23. An apparatus for wireless communication, comprising:
means for receiving data through one or more component carriers using a first radio access technology (RAT) and a first subscription service, wherein the data is received using a first set of hybrid automatic repeat request (HARQ) processes;
means for determining to perform a radio tune-away to a second RAT or a second subscription service;
means for determining an amount of memory space associated with a second set of HARQ processes for the second RAT or the second subscription service; and
means for selectively releasing, based at least in part on the determined amount of memory space being greater than an available space of an HARQ memory, a portion of the HARQ memory used for the first set of HARQ process, the means for releasing of the portion of the HARQ memory used for the first set of HARQ process comprises:
means for identifying a list of to-be-released component carriers from the one or more component carriers based on a priority of each of the one or more component carriers and the priority of each of the one or more component carriers is based on whether each of the one or more component carriers is actively receiving data; and
means for releasing the portion of the HARQ memory used for the first set of HARQ process associated with the identified list of to-be-release component carriers.

24. The apparatus of claim 23, wherein:
whether each of the one or more component carriers is actively receiving data is indicated by a connection status, wherein the connection status is one of configured or active.

25. The apparatus of claim 24, wherein:
the priority of each of the one or more component carriers is further based on a load metric for each of the one or more component carriers, wherein the load metric is calculated based on HARQ parameters.

26. The apparatus of claim 25, wherein:
the HARQ parameters comprise at least one of a HARQ identification (ID), a HARQ time window, a new data indicator, a number of transport blocks, a decode-fail transport block (TB) size, or a number of transmission layers, or combinations thereof.

27. The apparatus of claim 23, wherein: a primary component carrier is excluded from the list of to-be-released component carriers.

28. The apparatus of claim 23, wherein: a component carrier with a connection status as active is excluded from the list of to-be-released component carriers.

29. The apparatus of claim 23, wherein:
the method is performed by a user equipment (UE) with only one radio transceiver and one or more subscriber identification modules (SIM).

30. The apparatus of claim 29, wherein:
the UE is capable of dual SIM dual standby (DSDS).

31. The apparatus of claim 29, wherein:
the UE is capable of single SIM dual subscription (SSDS).

32. The apparatus of claim 23, wherein:
selectively releasing the portion of the HARQ memory is further based on a priority of each of the first set of HARQ processes.

33. The method of claim 32, wherein:
selectively releasing the portion of the HARQ memory is further based on a priority of each of a plurality of code block decoding processes within each of the first set of HARQ processes.

34. A non-transitory computer readable medium storing code for wireless communication, the code comprising instructions executable by a processor to:
receive data through one or more component carriers using a first radio access technology (RAT) and a first subscription service, wherein the data is received using a first set of hybrid automatic repeat request (HARQ) processes;
determine to perform a radio tune-away to a second RAT or a second subscription service;
determine an amount of memory space associated with a second set of HARQ processes for the second RAT or the second subscription service; and
selectively release, based at least in part on the determined amount of memory space being greater than an available space of an HARQ memory, a portion of the HARQ memory used for the first set of HARQ process, the release of the portion of the HARQ memory used for the first set of HARQ process comprises:
identify a list of to-be-released component carriers from the one or more component carriers based on a priority of each of the one or more component carriers and the priority of each of the one or more component carriers is based on whether each of the one or more component carriers is actively receiving data; and
release the portion of the HARQ memory used for the first set of HARQ process associated with the identified list of to-be-release component carriers.

35. The non-transitory computer readable medium of claim 34, wherein:
whether each of the one or more component carriers is actively receiving data is indicated by a connection status, wherein the connection status is one of configured or active.

36. The non-transitory computer readable medium of claim 35, wherein:
the priority of each of the one or more component carriers is further based on a load metric for each of the one or more component carriers, wherein the load metric is calculated based on HARQ parameters.

37. The non-transitory computer readable medium of claim 36, wherein:
the HARQ parameters comprise at least one of a HARQ identification (ID), a HARQ time window, a new data indicator, a number of transport blocks, a decode-fail transport block (TB) size, or a number of transmission layers, or combinations thereof.

38. The non-transitory computer readable medium of claim 34, wherein: a primary component carrier is excluded from the list of to-be-released component carriers.

39. The non-transitory computer readable medium of claim 34, wherein: a component carrier with a connection status as active is excluded from the list of to-be-released component carriers.

40. The non-transitory computer readable medium of claim 34, wherein:
the apparatus is a user equipment (UE) with only one radio transceiver and one or more subscriber identification modules (SIM).

41. The non-transitory computer readable medium of claim 40, wherein:
the UE is capable of dual SIM dual standby (DSDS).

42. The non-transitory computer readable medium of claim 40, wherein:
the UE is capable of single SIM dual subscription (SSDS).

43. The non-transitory computer readable medium of claim 34, wherein:
selectively releasing the portion of the HARQ memory is further based on a priority of each of the first set of HARQ processes.

44. The non-transitory computer readable medium of claim 34, wherein:
selectively releasing the portion of the HARQ memory is further based on a priority of each of a plurality of code block decoding processes within each of the first set of HARQ processes.

* * * * *